No. 171. REISSUED JUNE 11, 1850.

G. SPAFFORD.

DIGESTING RAGS FOR PAPER PULP.

UNITED STATES PATENT OFFICE.

JOHN CAMPBELL, OF NEW YORK, N. Y., ASSIGNEE OF GEORGE SPAFFORD.

IMPROVEMENT IN MACHINES FOR BOILING AND WASHING RAGS FOR MANUFACTURING PAPER.

Specification forming part of Letters Patent No. 1,753, dated September 2, 1840; Reissue No. 171, dated June 11, 1850.

*To all whom it may concern:*

Be it known that the following is a full, clear, and exact description of a new and useful process for preparing rags and other materials for making pulp in the manufacture of paper, and of the machinery for carrying the same into effect, invented by the late GEORGE SPAFFORD, of Windham, in the State of Connecticut, and for which Letters Patent of the United States were granted to him on the 2d day of September, in the year 1840, the said Letters Patent being herewith surrendered for the purpose of having the same invention described and presented in a more full, clear, and exact manner than was done in the original specification, and of having a new patent issued upon the specification so amended.

The invention consists in digesting with an alkaline or other liquid in a close burning vessel the rags or other fibrous materials for making paper-pulp, the heat being applied to the exterior of the vessel, or by steam introduced within it, as may be deemed most expedient.

Figure 1:
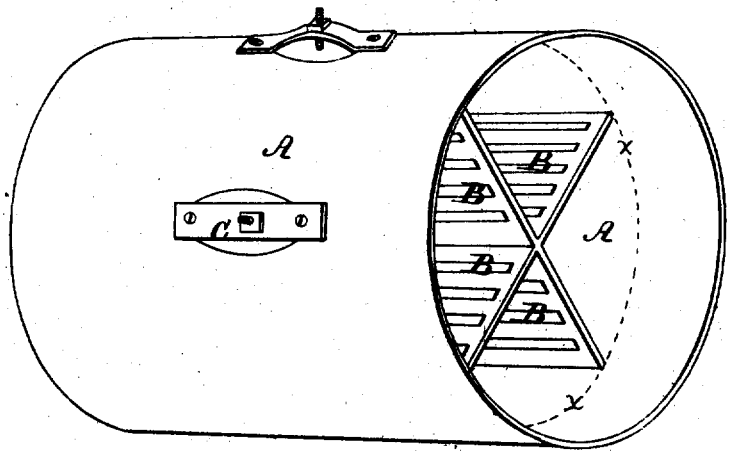
Figure 2:
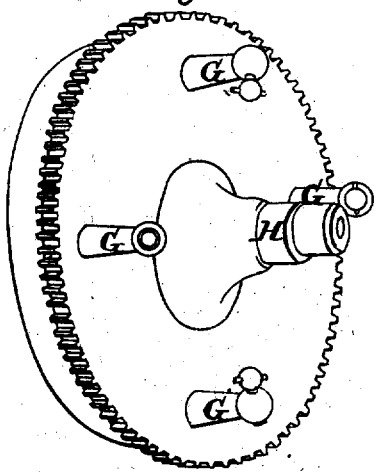
Figure 3:
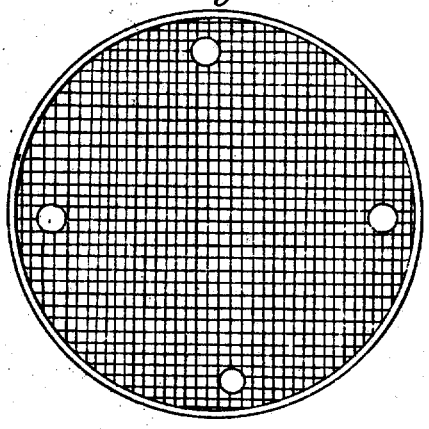

In the accompanying drawings, Figure 1 is a perspective view of a close cylindrical boiler and its appendages, one of its heads being removed to expose its interior. Fig. 2 is a view in perspective of the head detached from the boiler; and Fig. 3 is a section of the boiler at the line *x x* of Fig. 1, showing a diaphragm of strong reticulated wire.

The body of the boiler A A, Fig. 1, should be made of iron boiler-plate or other suitable material strong enough to resist any internal pressure to which the machine may be subjected, and of any convenient dimensions. One ten feet in length and four feet in diameter will hold as a proper charge about one thousand three hundred pounds of rags, with the appropriate quantity of lye, say about one hundred gallons, of a solution of potash, soda, or lime, in water. When other materials than rags are to be operated upon—as, for example, straw, cotton-waste, &c.—the proportions of the charge will vary; but these variations can easily be determined by the operator. C C C are man-holes in the side of the vessel, of which any suitable number may be made, and through which the charge is introduced and withdrawn.

The heads of the boiler are provided with tubular journals or trunnions H, by which the boiler is hung in any suitable frame provided with appropriate bearings. The heads are likewise provided with any convenient number of stop-cocks, G G, for drawing off the liquid from the boiler. The interior of the boiler is divided into several compartments by longitudinal grated partitions B, which abut at one end against the grated diaphragm, Fig. 3, and at the other against the head of the boiler. The main use of these partitions is to facilitate the operation of washing, when the apparatus is occasionally used for that purpose, by dividing the charge into several distinct parts, and in this way rendering the access of water to every part of it more easy and certain. The grated diaphragm seen in Fig. 3, and whose position is represented by the dotted line *x x* in Fig. 1, is likewise designed to facilitate the process of washing by acting as a strainer to retain the charge while a stream of water is passed through it.

Although the operation of washing may be performed within the boiler when it is provided with the grated partitions and diaphragm, yet, as this is a distinct process, it could be effected with greater propriety in a separate vessel. Therefore it would in most cases be advisable to omit the partitions and diaphragm in the construction of the boiler, as well to save cost as because the boiler, as a digester, will answer well without these devices.

When this apparatus is to be used, the charge of rags or other material for making the pulp and the liquid with which it is to be digested may both be introduced through the same man-hole, or the liquid may be introduced through one of the hollow trunnions H. The vessel is then closed, steam is introduced through one or both of the trunnions to heat the charge, and at the same time the boiler is put in motion by any suitable machinery which will turn it with a proper velocity, that of about five revolutions a minute having been found to produce a good result. The application of heat and the turning of the vessel are continued until the materials are properly digested, the time required being easily determined by practice and varying according to the circumstances of each particular case. After the charge has been properly digested, the steam is shut off, the liquor is drawn off from the boiler, either through the stop-cocks or man-holes, and the digested materials are discharged by revolving the boiler with the man-holes open.

It is obvious that the boiler may be varied in its form and in the manner and position in which it is caused to turn or move without affecting the principle of the invention, and it is contemplated so to vary its arrangements as circumstances may render expedient.

The manner in which the heat required in the process is applied may likewise be varied—as, for example, by surrounding the boiler with a steam-jacket or by placing it over a furnace.

Previous to the introduction of the above-described process the materials were digested in a stationary vessel, in which the agitation was produced by the boiling alone, which, from the unequal density of the mass, was unequal in different portions of the same vessel; hence this process was defective even when the best stock was operated upon, and the paper produced from the same charge was not of a uniform quality. When the more refractory materials used in the manufacture of paper were subjected to this operation—such, for example, as straw and cotton-waste—the result was still more defective, as the knotty portions of the straw and the greasy portions of the cotton-waste were penetrated with difficulty by the digesting-liquid, aided by the slight agitation produced by the boiling alone. The process herein described produces such an agitation by the turning of the boiler, and so effectually intermingles the steam and the digesting-liquid with the charge that the latter is digested in the most equable manner, with great economy of heat and time, and the knotty and greasy portions of the above-mentioned refractory materials are penetrated thoroughly and acted upon by the digesting-liquid and the heat. From the thorough agitation of the charge no portion of it is liable to be overheated or to be unequally affected by the digesting-liquid, and hence the average quality of paper produced will be better and more uniform than was possible when the stock was prepared by the old process.

What is claimed is—

The hereinbefore-described process of preparing materials for making pulp in the manufacture of paper by digesting them in a turning vessel with an alkaline solution or other liquid, the heat being applied to the outside of the vessel, or by steam introduced within it, substantially as herein set forth.

JOHN CAMPBELL,

*Assignee of the whole right of the late George Spafford.*

Witnesses:

AUGUSTINE SMITH,
JOHN W. WILSON.